United States Patent [19]

Seitz et al.

[11] Patent Number: 4,516,617

[45] Date of Patent: May 14, 1985

[54] METHOD OF MOUNTING A TIRE

[75] Inventors: Hans Seitz; Udo Frerichs, both of Langenhagen; Heinz-Dieter Rach, Garbsen; Siegmund Spendel, Betheln, all of Fed. Rep. of Germany

[73] Assignee: Continental Gummi-Werke Aktiengesellschaft, Hanover, Fed. Rep. of Germany

[21] Appl. No.: 530,864

[22] Filed: Sep. 9, 1983

[30] Foreign Application Priority Data

Sep. 9, 1982 [DE] Fed. Rep. of Germany ....... 3233441

[51] Int. Cl.³ .............................................. B60C 25/00
[52] U.S. Cl. ...................................................... 157/1
[58] Field of Search ................................ 157/1; 425/31

[56] References Cited

U.S. PATENT DOCUMENTS 3,554,262  1/1971  Swanson .................................... 157/1

Primary Examiner—James G. Smith
Attorney, Agent, or Firm—Becker & Becker, Inc.

[57] ABSTRACT

A method of mounting a tire on a rim. Contemplated are vehicle wheels having rims where the seats for the tire beads are disposed along the inner periphery of the rim respectively next to a radially inwardly extending rim flange. The rims also have circumferential recessed portions which are disposed next to the seats and which have a base with a diameter which is greater than the diameter of the seats. The following method steps are involved. The rim and the tire are moved toward one another, with their axes of rotation being disposed at an angle to one another. The rim is introduced into the tire, at least one bead portion of which has assumed an oval shape. The rim is rotated. A portion of one of the beads, the seat of which extends parallel to the rim seat, is intorduced into the recessed portion of the rim. Subsequently, the rest of that bead is inserted. After the same procedure is repeated for the other bead, the tire is inflated with air, so that the beads are brought onto the rim seats.

6 Claims, 7 Drawing Figures

METHOD OF MOUNTING A TIRE

BACKGROUND OF THE INVENTION

The present invention relates to a method of mounting a tire on a rim, and is intended for tires where either the axial distance between the beads in the vulcanizing state is considerably greater than the width of the tread and the beads can be shifted relative to the core, or where the axial distance between the beads in the vulcanizing state is approximately the same as or smaller than the width of the tread; the rim has seats for the tire beads along the inner periphery of the rim; these seats are respectively adjacent a rim flange, each of which extends radially inwardly; next to each of the rim seats is a circumferential recessed portion, the base of which has a diameter which is greater than the diameter of the rim seats.

A vehicle wheel having a tire and a rim of the aforementioned type is described, for example, in German Offenlegungsschrift No. 30 00 428. Considerable difficulties can be encountered when mounting such a tire, especially when the customary drop-center or well base of the rim of this known wheel is omitted.

The first difficulty is already encountered in trying to guide one bead of the tire over the outside of the rim. With one heretofore known method, this was carried out with the rim tilted to a certain extent, and was only possible by exerting a lot of force.

Even more difficult was the surmounting of the radially inwardly extending rim flange for introducing one tire bead on a given radially inwardly disposed bead seat of the rim. This was attempted by making the bead cores of the tire so flexible that they could be brought into a shape, the maximum diameter of which was less than the diameter formed by the rim flanges. However, such a deformation was only possible if the side walls of the tire were made particularly long. Furthermore, safety and reliability problems are present.

It is an object of the present invention to provide a simple method of mounting a tire on a rim in connection with a vehicle wheel of the aforementioned general type.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
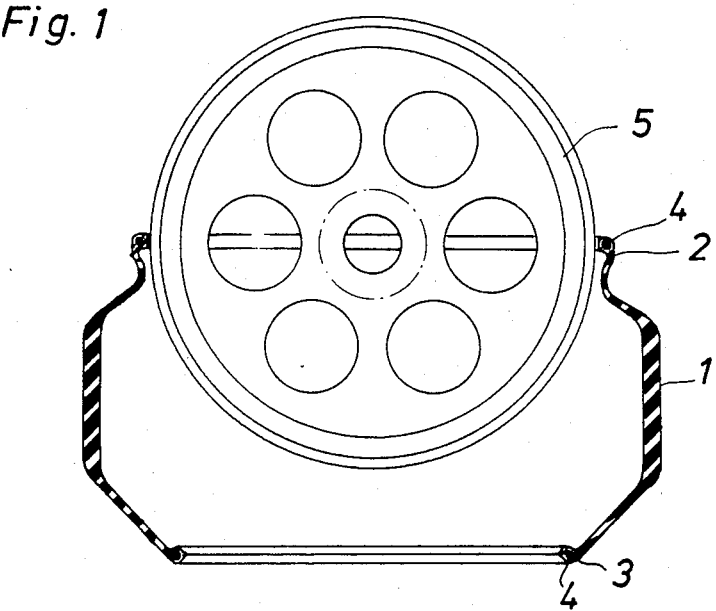
FIG. 1 schematically illustrates a rim which has been partially introduced into a tire.

The method of the present invention is characterized by the following steps:

(a) The rim and the tire are moved toward one another, with their axes of rotation preferably being essentially at right angles to one another, or at least in a range of from 60°–120° relative to one another;

(b) the rim is introduced into the interior of the tire in the direction of the axis of rotation thereof, with at least one the tire beads in the mean time assuming an oval shape;

(c) while keeping the rim in the interior of the tire, the rim is rotated by 90°, or by whatever amount is necessary in order that the axes of rotation of the rim and of the tire extend parallel to one another or coincide;

(d) a portion of one of the beads of the tire is introduced into the recessed portion of the rim, and subsequently the entire periphery of that bead is inserted therein;

(e) step (d) is repeated for the other bead; and (f) the tire is inflated with air for bringing the beads onto the rim seats.

For a tire having a large axial distance between the beads, the bead and possibly also the side wall region of the tire are turned in until the seat on the tire bead and the seat on the rim extend approximately parallel to one another when viewed in cross section.

The present invention offers the advantage that the mounting of a tire can be carried out at least partially mechanically, and that no great forces have to be exerted.

The mounting method can be carried out particularly favorably, and in a manner protective of the tire, if, pursuant to a further embodiment of the present invention, the tire, during mounting and prior to the aforementioned step (b), has at least one of the bead regions brought into an oval shape by external forces.

The mounting method of the present invention is suitable not only for tires which are vulcanized with their beads spread far apart, i.e. with a great axial distance between the beads, which distance is approximately twice the width of the tread, but also for tires where the distance between the beads in the vulcanizing state corresponds approximately to the width of the tread, or is even less than this width. With the first type of tire, it can be expedient, or with relatively short side walls is even necessary, for better handling to make the beads in such a way that they can be shifted relative to the bead cores. This can be achieved, for example, by inserting a non-rubberized fabric lining about the core.

During the aforementioned step (a), the rim and tire can be moved toward one another in such a way that their axes of rotation are either essentially at right angles to one another, or are at an angle of greater than or less than 90° to one another, preferably in the range of 60°–120° to one another. In conformity therewith, in step (c), the rim is either rotated approximately 90°, or by greater than or less than 90°, again preferably 60°–120°, until the axes of rotation of the rim and of the tire extend parallel to one another or coincide.

DESCRIPTION OF PREFERRED EMBODIMENTS

Referring now to the drawings in detail, the inventive method of mounting will first be explained with the aid of FIGS. 1–5 in connection with a tire 1 having beads 2 and 3 which are disposed quite far apart from one another. In the vulcanizing state, the axial distance between the two beads 2 and 3 is approximately two times the width of the tread. Pull resistant and pressure resistant bead cores 4 are disposed in the beads 2, 3. If necessary, as is particularly the case with relatively short side walls, the beads 2, 3 can be made in such a way that they can move relative to the bead core 4. In order to provide this movability, it is possible, for example, to surround the cores 4 with a non-rubberized fabric.

When in the specification mention is made of a movement of the rim toward the tire, it is actually the relative movement that is important. In other words, such a movement could also be a movement of the tire toward the rim, or a simultaneous movement of the tire and rim toward one another. The axes of rotation of the tire and the rim should, by definition, be identical to the axis of rotation of the mounted wheel.

Pursuant to a first method step, as illustrated in FIG. 1, the rim 5, with its axis of rotation preferably substantially at right angles to the axis of rotation of the tire 1, though the angle can be greater than or less than 90°, preferably 60°–120°, is moved toward the tire 1 and is then introduced into the interior of the tire. In so doing, the bead region 2 of the tire 1 is deformed into an oval. The introduction of the rim 5 is particularly easy, and protects the tire, if the deformation of the tire 1 is already undertaken by external forces prior to the introduction of the rim 5, for example by fixing the tire 1 in a holding device.

Figure 2:
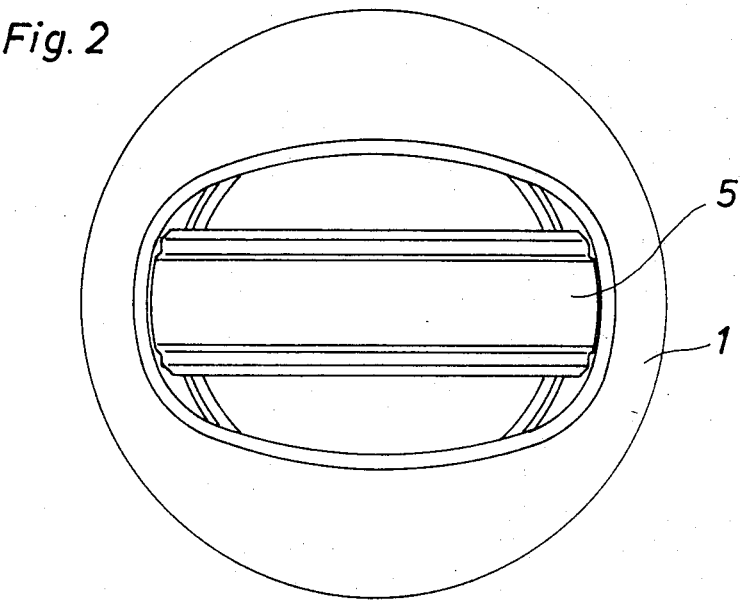
FIG. 2 is a plan view of the tire and rim in the position of FIG. 1.

FIG. 2 shows the tire 1 and the rim 5 in the relative position of FIG. 1, however as a plan view, i.e. the direction of viewing is shifted by 90°. After the rim 5 has been inserted into the interior of the tire 1 to such an extent that its axis of rotation is disposed in the central plane of the tire, it is rotated by 90°, or by whatever angle, in conformity with the aforementioned orientation, is necessary in order that the axis of rotation of the rim 5 and of the tire 1 extend parallel to one another or coincide.

Figure 3:
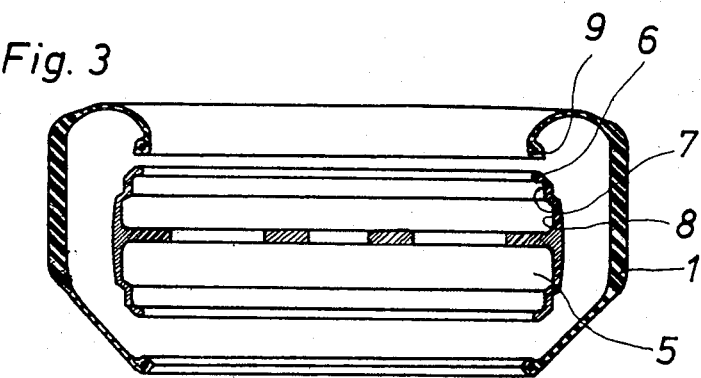
FIG. 3 shows the rim in the interior of the tire, with the axes of rotation parallel to one another, and one bead turned in to such an extent that its seat extends approximately parallel to the seat of the rim.

As shown in FIG. 3, the rim 5 is now completely in the interior of the tire 1. In this view, one can clearly see on the rim 5 the rim flange 6, the seat 7 for the tire, and a recessed portion 8.

In a next step, the tire 1, in the region of the bead 2, and possibly also in the adjoining side wall region, is turned in to such an extent that the seat 9 on the bead 2, and the seat 7 on the rim 5, extend approximately parallel to one another when viewed in cross section. In so doing, if necessary, the bead 2 can be shifted somewhat about the bead core 4.

Figure 4:
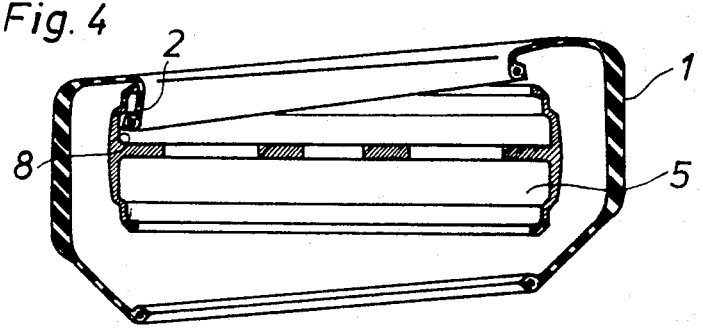
FIG. 4 shows the wheel with one portion of one of the beads inserted into the recessed portion of the rim.

Subsequently, as shown in FIG. 4, a portion of the bead 2 is introduced into the recessed portion 8, whereupon the rest of the bead 2, over its entire periphery, is inserted. The recessed portion 8 is dimensioned such that the bead 2 can just surmount the rim flange 6. The subsequent insertion of the bead 2 over its entire periphery can be mechanically effected with an ordinary roller arrangement.

Figure 5:
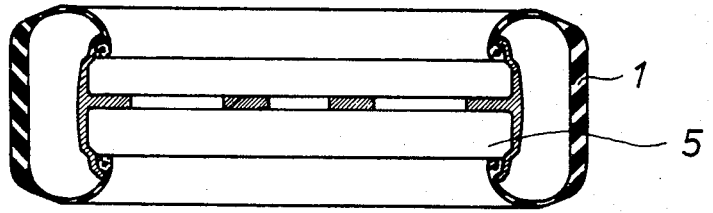
FIG. 5 shows the wheel with the tire fully mounted.

The just described mounting is now repeated for the second tire bead 3. Thereupon, the tire can be filled with air. FIG. 5 illustrates a fully mounted tire 1.

Figure 6:
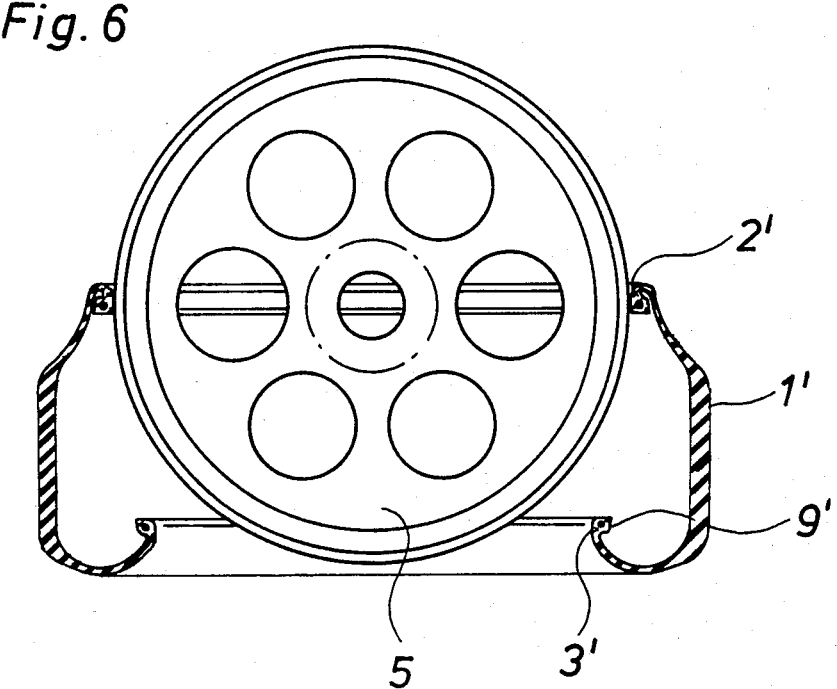
FIG. 6 shows a further wheel with a partially introduced rim, the axes of rotation being at right angles to one another.

The mounting of a tire 1' will now be described with the aid of FIGS. 6 and 7. With the tire 1', the axial distance between the beads 2' and 3' in the vulcanizing state corresponds approximately to the width of the tread, or is even less, and the seats 9' on the beads 2', 3', already in the normal position of the non-mounted tire 1', are approximately parallel to the rim seats 7 of a rim 5 located in the interior of the tire 1' (FIG. 7).

To begin with, the rim 5, again with its axis of rotation either substantially at right angles to the axis of rotation of the tire 1', or at an angle greater to or less than 90°, preferably 60°–120°, is introduced into the interior of the tire 1' and is then rotated by 90°, or by an angle of greater than or less then 90°, in conformity with the aforementioned orientation.

Figure 7:
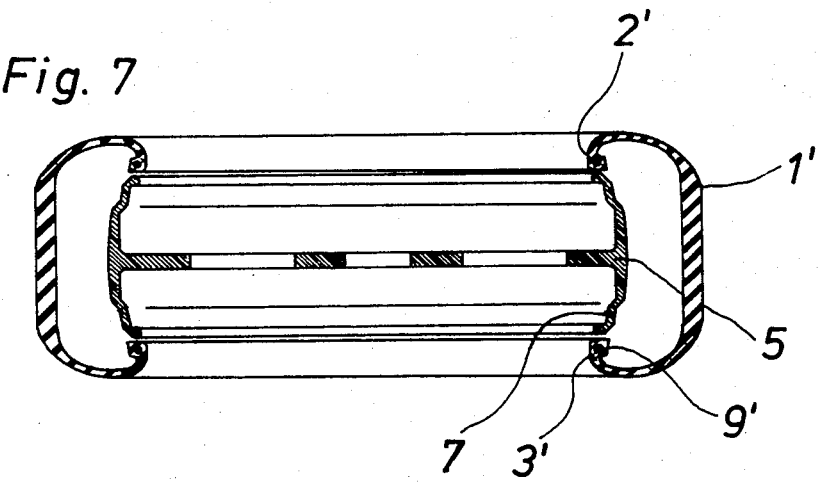
FIG. 7 shows the wheel of FIG. 6, with the rim in the interior of the tire, and the axes of rotation parallel to one another.

The subsequent turning in, described in connection with the tire 1, is eliminated, because as shown in FIG. 7, with the tire 1' the seats 9' at the beads 2', 3' already extend parallel to the rim seats 7 when viewed in cross section.

The remaining method steps, mainly introducing a portion of one bead into the recessed portion of the rim, subsequently introducing the entire periphery of the bead, repeating these last two steps for the other bead, and inflating the tire, correspond to the mounting steps described in connection with the first tire 1.

The present invention is, of course, in no way restricted to the specific disclosure of the specification and drawings, but also encompasses any modifications within the scope of the appended claims.

What we claim is:

1. A method of mounting a tire on a rim, for both the situation where in the vulcanizing state the axial distance between the bead regions of the tire is considerably greater than the width of the tread, and the bead regions could even be capable of being shifted relative to the bead cores, and the situation where in the vulcanizing state the axial distance between the bead regions is at most approximately the same as the width of the tread; the rim has two seats along its inner periphery, each of said seats being adjacent to a radially inwardly extending rim flange and to a circumferential recessed portion, the diameters of the bases of which are greater than the diameters of said rim seats; said tire also has two seats, one on each bead region in the vicinity of the bead core thereof; said tire and said rim each have an axis of rotation; said method includes the steps of:

providing a relative movement of said rim and said tire toward one another while keeping their axes of rotation at an angle to one another;

introducing said rim into the interior of said tire in the direction of the axis of rotation of said tire, with at least one of said tire bead regions at this point having assumed an oval shape;

rotating said rim in such a way that the axes of rotation of said rim and said tire are at least parallel to one another, and the rim is in the interior of said tire;

with the seat of a given tire bead region, when viewed in cross section, approximately parallel to an adjacent seat of said rim, introducing a portion of said given bead region into the adjacent recessed portion of said rim;

introducing the remainder of said given bead region, over its entire periphery, into said adjacent recessed portion of said rim;

repeating said last two introducing steps for the other tire bead region; and inflating said tire with air to bring said seats of said bead regions onto said seats of said rim.

2. A method according to claim 1, which, for a tire where in the vulcanizing state the axial distance between the bead regions is great, includes the step of turning in at least said bead regions until said seats thereof, when viewed in cross section, extend approximately parallel to said seats of said rim.

3. A method according to claim 1, which, prior to said step of introducing said rim into the interior of said tire, includes the step of bringing at least one of said tire bead regions into an oval shape with external force.

4. A method according to claim 1, in which said step of providing relative movement of said rim and said tire toward one another includes keeping their axes of rotation substantially perpendicular to one another; and in which said step of rotating said rim includes rotating said rim by substantially 90°.

5. A method according to claim 1, in which said step of providing relative movement of said rim and said tire toward one another includes keeping their axes of rotation at an angle of greater than or less than 90° to one another; and in which said step of rotating said rim includes rotating said rim by an angle of greater than or less than 90° in conformity with said angle of said axes of rotation relative to one another.

6. A method according to claim 5, in which said angle of rotation of said rim, and said angle of said axes of rotation relative to one another is in the range of 60°–120°.

* * * * *